United States Patent [19]

Thiele

[11] Patent Number: 5,622,457

[45] Date of Patent: Apr. 22, 1997

[54] PNEUMATIC MATERIAL HANDLING SYSTEM

[75] Inventor: Charles W. Thiele, Kalamazoo, Mich.

[73] Assignee: Motan, Inc., Plainwell, Mich.

[21] Appl. No.: 253,085

[22] Filed: Jun. 2, 1994

[51] Int. Cl.$^6$ ............................................. B65G 53/56
[52] U.S. Cl. ........................ 406/1; 406/120; 406/156; 406/182
[58] Field of Search ........................... 406/1, 2, 3, 117, 406/118, 119, 120, 155, 156, 182

[56] References Cited

U.S. PATENT DOCUMENTS

| | | | |
|---|---|---|---|
| 2,252,501 | 8/1941 | Foresman | 406/120 |
| 3,188,145 | 6/1965 | Strong | 406/182 X |
| 4,157,848 | 6/1979 | Smoot | 406/182 |
| 4,442,865 | 4/1984 | Shigeo | 406/182 X |
| 4,469,135 | 9/1984 | Gray | 406/182 X |
| 4,583,885 | 4/1986 | Thiele | 406/168 |
| 4,893,656 | 1/1990 | Willhoft | 406/182 X |
| 5,147,152 | 9/1992 | Link | 406/1 |
| 5,340,241 | 8/1994 | Thiele et al. | 406/132 |
| 5,354,152 | 10/1994 | Reinhardt et al. | 406/182 X |

*Primary Examiner*—Andrew C. Pike
*Attorney, Agent, or Firm*—Flynn, Thiel, Boutell & Tanis, P.C.

[57] ABSTRACT

A pneumatic material handling system for conveying dry, solid particulate product from one of at least two separate upstanding dry, solid particulate product supply containers to at least one desired destination. At least two identically constructed valves are connected into the conduit system intermediate the supply containers and the desired destination. Each of the two valves includes a base plate having at least first and second separate through passageways extending therethrough and a movable plate slidably mounted on the base plate and movable between first and second positions relative to the base plate. The movable plate has a third through passageway extending therethrough and being axially aligned with the first through passageway in the first position of the movable plate and with the second through passageway in the second position of the movable plate. A drive mechanism is provided for moving the movable plate between the first and second positions.

8 Claims, 4 Drawing Sheets

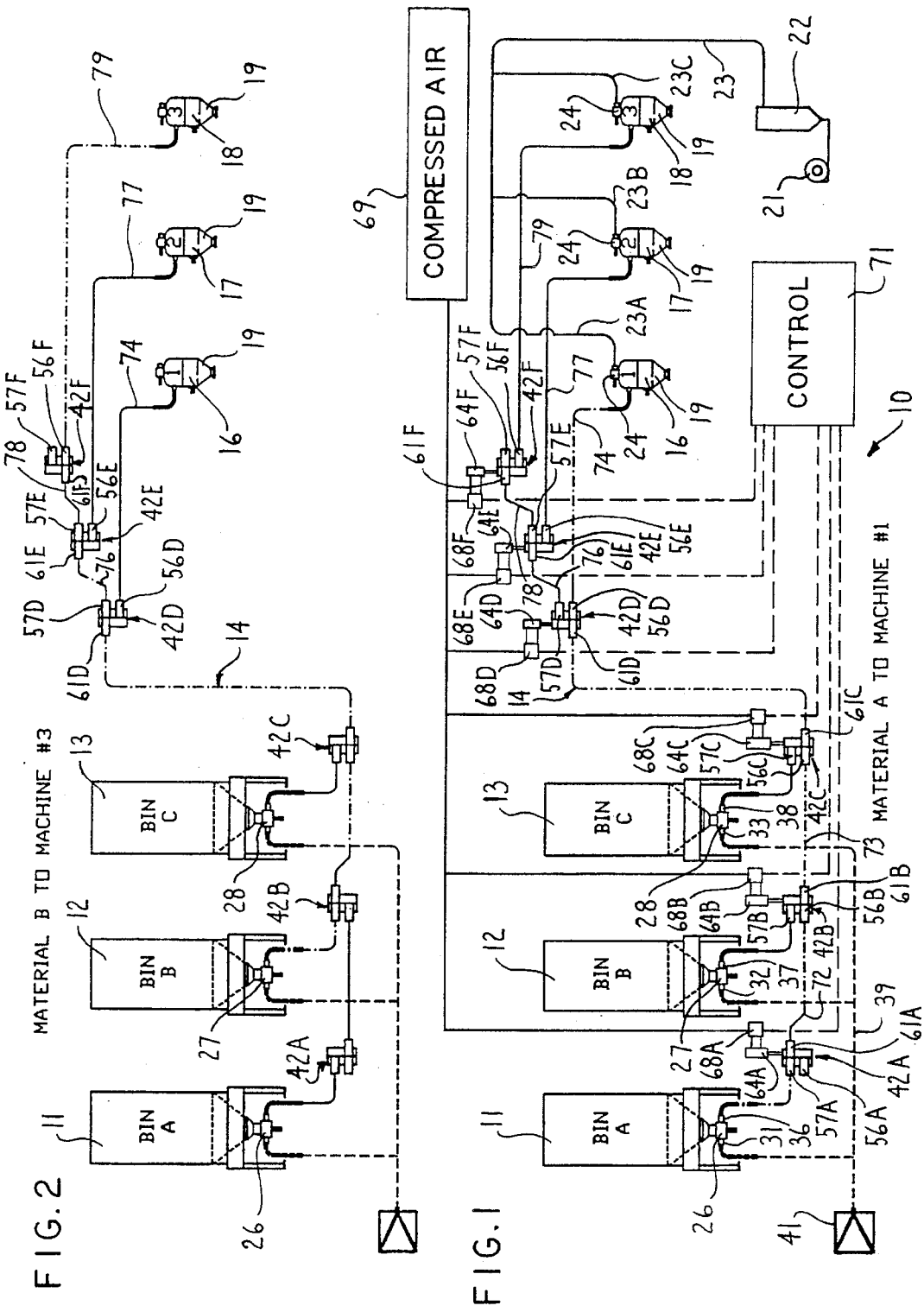

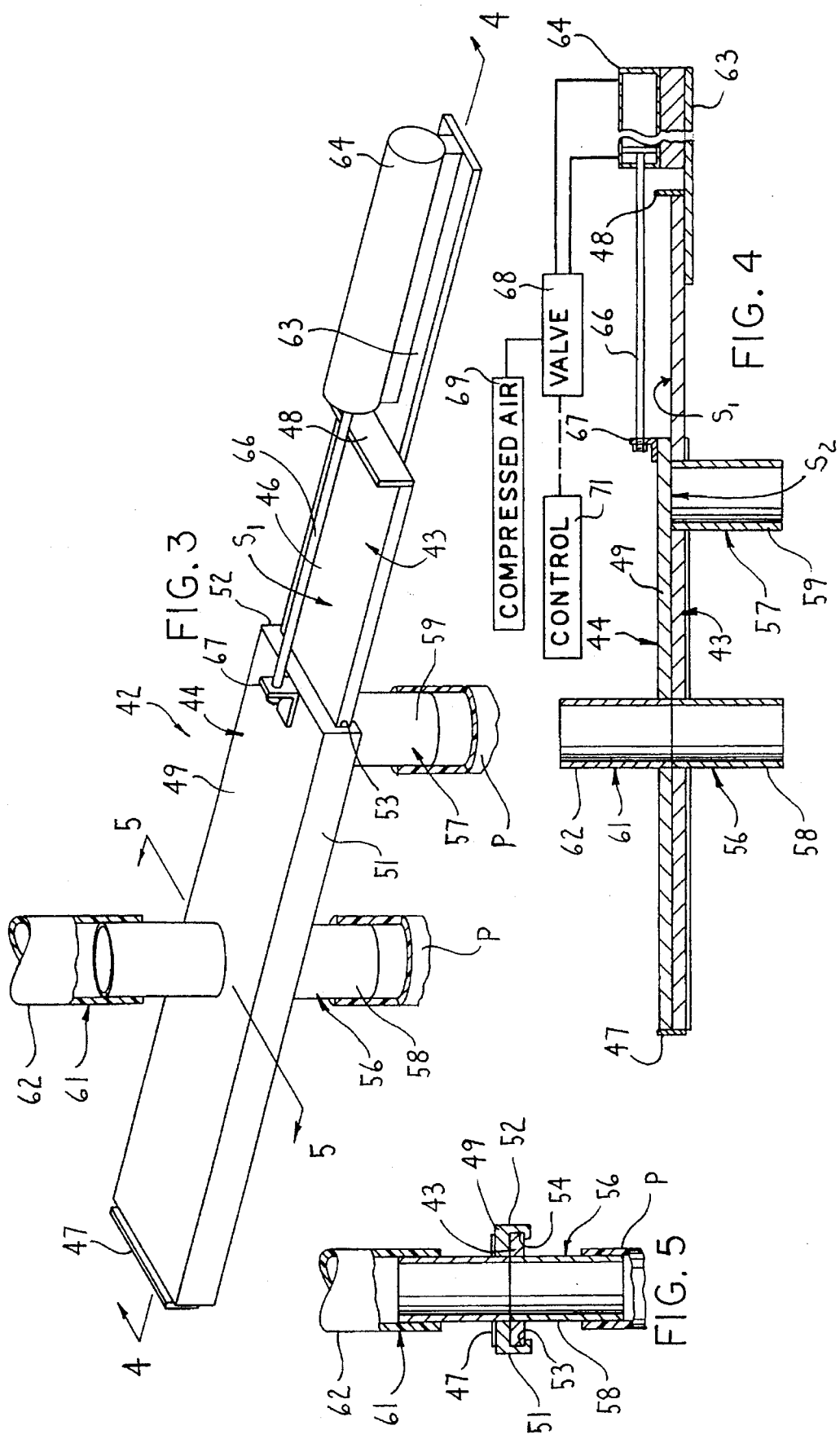

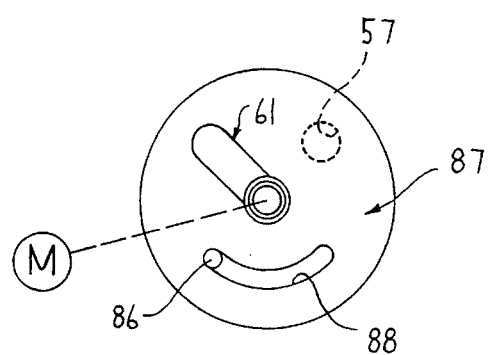
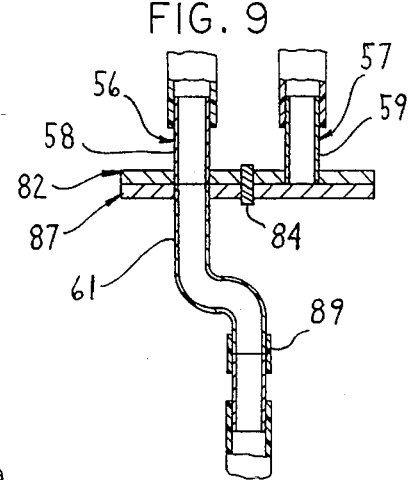
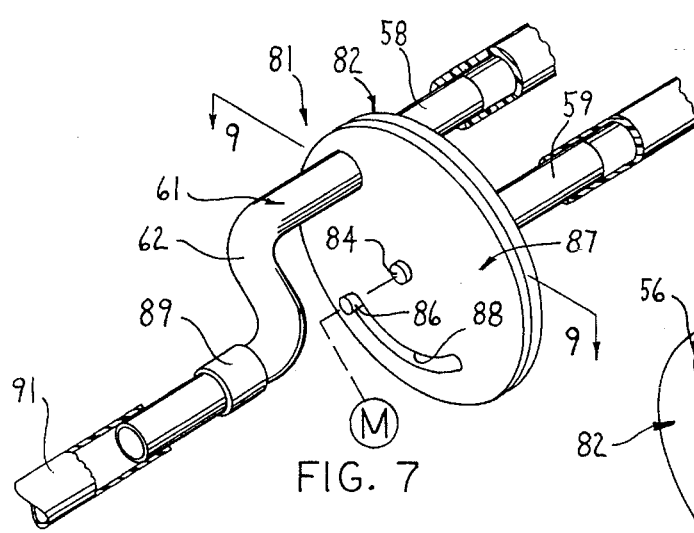
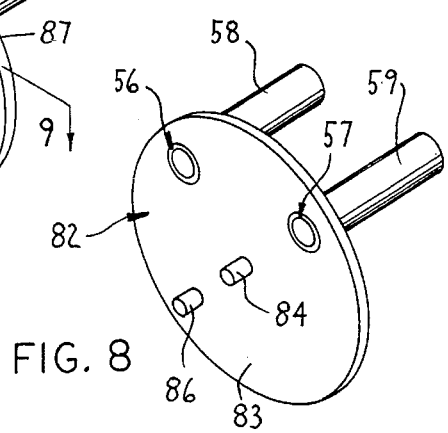

PNEUMATIC MATERIAL HANDLING SYSTEM

FIELD OF THE INVENTION

This invention relates to a pneumatic material handling system and, more particularly, to a system incorporating therein identical dry, solid particulate product control valves for controlling the flow of product from a selected one of a plurality of separate product supply containers to at least one desired destination or from at least one product supply container to a selected one of a plurality of desired destinations.

BACKGROUND OF THE INVENTION

Oftentimes in pneumatic conveying systems, plural storage bins are provided for different dry, powdered, and/or granular products. It is desired to convey a selected product in one of the bins to a selected one of numerous desired destinations, such as a sealed vessel from which conveyed product can be continuously or intermittently discharged. One type of sealed vessel is a vacuum receiver, an example of which is illustrated in U.S. Pat. No. 4,583,885. The disclosure in U.S. Pat. No. 4,583,885 is to be incorporated herein by reference. It is to be noted that the disclosure in U.S. Pat. No. 4,583,885 draws the product from a conventional gaylord material source. When plural and different storage bins for product is incorporated into a system, a material flow management system is required in order to assure that the proper product in one of the bins is distributed to the proper desired destination and still allow the conveying system to be purged. One type of system which has structure therein for facilitating a purge is disclosed in U.S. Pat. No. 5,340,241, and which is assigned to the same assignee as is the present invention. The disclosure in the aforementioned U.S. Pat. No. 5,340,241 is to be incorporated herein by reference.

SUMMARY OF THE INVENTION

Accordingly, it is an object of this invention to provide a pneumatic material handling system which includes therein a plurality of identical material flow control valves which are simple in construction, but yet provide the requisite sealing to maintain the requisite vacuum conveying forces needed to move the product from a selected storage bin to the desired destinations and without causing the product to become plugged up in the conveying conduits.

It is a further object of the invention to provide a pneumatic material handling system, as aforesaid, wherein the material flow control valves each has an inlet and plural outlets with a driving mechanism being provided for optionally connecting the inlet to a selected one of the outlets.

It is a further object of the invention to provide a pneumatic material handling system, as aforesaid, wherein the valves require a minimum of inventoried components due to the identical construction thereof.

It is a further object of the invention to provide a pneumatic material handling system, as aforesaid, wherein the system is sufficiently flexible in that it can function automatically and can be expanded by easily adding supply containers and/or desired destinations or reduced by easily taking components off-line, all without adversely effecting the operability or the efficiency of the system.

It is a further object of the invention to provide a pneumatic material handling system, as aforesaid, wherein the system includes the ability to provide additional desired destinations or supply containers by simply also providing a valve embodying the invention and without impacting the integrity of the supply side or the destination side of the system.

It is a further object of the invention to provide a pneumatic material handling system, as aforesaid, wherein the valves are of durable construction and require a minimum of maintenance.

In general, the objects and purposes of the invention are met by providing a pneumatic material handling system which includes a conduit system for conveying dry, solid particulate product from a selected one of at least two separate upstanding dry, solid particulate product supply containers, each having a product outlet opening located at a lower end thereof and delivering product to a gas and product opening, to at least one desired destination or from at least one product supply container to a selected one of a plurality of desired destinations, at least two identically constructed valves connected into the conduit system intermediate the gas and product opening and the desired destination. Each of the two valves includes a base plate having at least first and second separate through passageways extending therethrough and a movable plate slidably mounted on the base plate and movable between first and second positions relative to the base plate. The movable plate has a third through passageway extending therethrough and being axially aligned with the first through passageway in the first position of the movable plate and with the second through passageway in the second position of the movable plate. A drive mechanism is provided for moving the movable plate between the aforesaid first and second positions. First connecting structure is provided for connecting each gas and product opening to a respective one of the first through passageways on the first and second valves. A second connecting structure is provided for connecting the second through passageway on the first valve to the third through passageway on the second valve while third connecting structure is provided for connecting the third through passageway on the first valve to the conduit system leading to the aforesaid desired destination. Thus, the position of the movable plate of the first and second valves determines which of the plural product supply containers the product is extracted from and picked up and entrained in the gas stream and conveyed to the desired destination.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a schematic diagram of a pneumatic material handling system embodying the invention;

FIG. 2 is similar to FIG. 1, except that product is extracted from a bin other than the one illustrated in FIG. 1 and conveyed to a desired destination other than the one illustrated in FIG. 1;

FIG. 3 is an isometric view of a material flow control valve incorporated into the system;

FIG. 4 is a sectional view taken along the line 4—4 of FIG. 3;

FIG. 5 is a sectional view taken along the line 5—5 of FIG. 3;

FIG. 6 is a top view of a modified material flow control valve;

FIG. 7 is an isometric view of the modified control valve;

FIG. 8 is an isometric view of a fragment of the material flow control valve illustrated in FIG. 7;

FIG. 9 is a sectional view taken along the line 9—9 of FIG. 7; and

DETAILED DESCRIPTION

Figure 10:
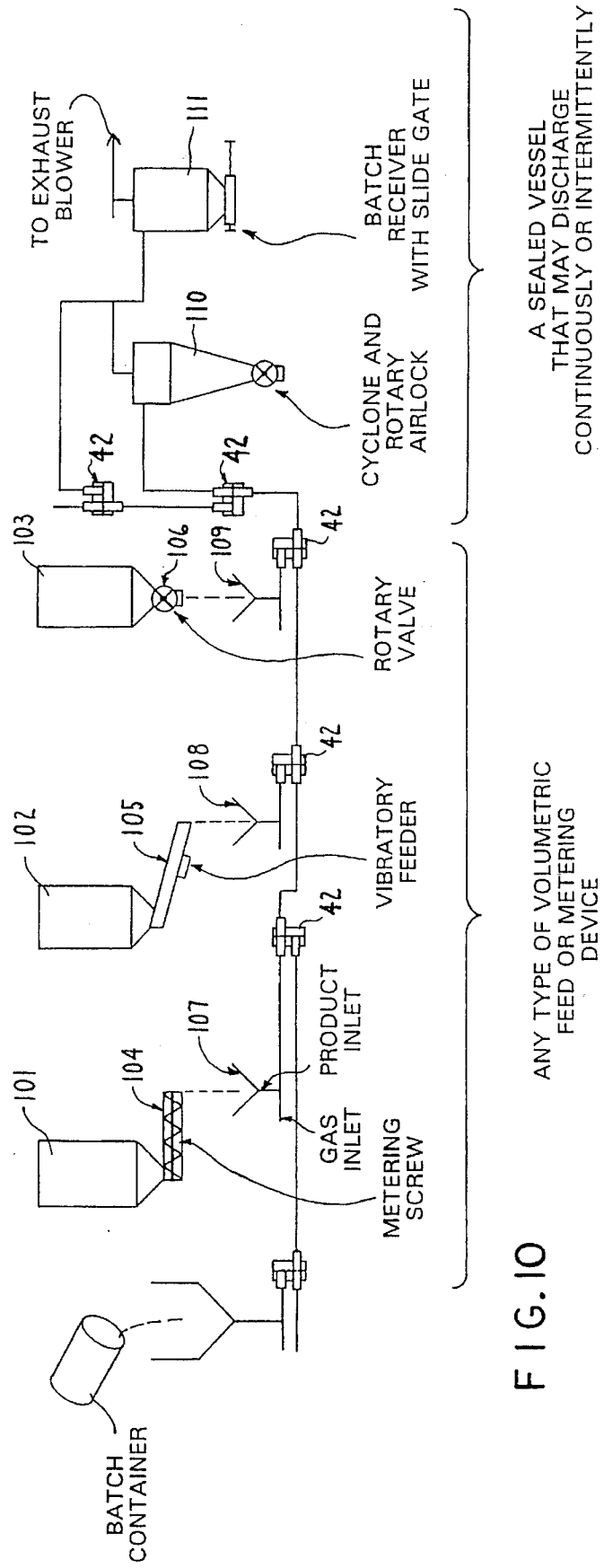
FIG. 10 is a schematic diagram of a pneumatic material handling system embodying the invention.

FIG. 1 illustrates a specific pneumatic material handling system 10 particularly adapted to convey a selected one of dry, powdered, and/or granular products A, B, or C in a selected one of a plurality of product supply containers 11, 12, and 13, respectively, to a selected destination consisting of one of a plurality of sealed containers, specifically vacuum receivers 16, 17, and 18 of the type, for example, illustrated in U.S. Pat. No. 4,583,885. The particular dry, powdered, and/or granular product A, B, or C entrained in the gas within the conduit 14, generally air, is extracted from the gas by the selected one of the vacuum receivers 16, 17, and 18 and collected in a hopper 19 associated with each vacuum receiver and oriented immediately below the receiver. An exhaust blower 21 is provided and is connected through a cyclone filter mechanism 22 and conduit 23, as well as conduit segments 23A, 23B, and 23C to each of the vacuum receivers 16, 17, and 18, respectively. Each vacuum receiver 16, 17, and 18 has a valve 24 for controlling the connection of the interior of the vacuum receiver to the conduit segments 23A, 23B, and 23C and thence to the exhaust blower 21. At the bottom end of each of the hoppers 19 there is usually provided a gate and beneath the gate there is provided an extruder having a hopper thereon. Since the aforementioned construction is conventional, further discussion of same is deemed to be unnecessary.

Each of the bins 11, 12, and 13 has a funnel-like construction at the lower end thereof with product A or B or C inside of each bin being delivered to an outlet at the lower end of the funnel construction. A hollow housing 26 is connected to the lower end of the funnel construction for the bin 11. Similarly, a hollow housing 27 is connected to the lower end of the funnel construction for the bin 12. In addition, a further hollow housing 28 is connected to the lower end of the funnel construction for the bin 13. Each of the aforesaid hollow housings 26, 27, and 28 are virtually identical in construction to the housing illustrated in the aforesaid U.S. Pat. No. 5,340,241. A flow control valve is oriented within each of the hollow housings in order to regulate the volume of material that is allowed to flow into the hollow housing when the valve is open and in accordance with that described in detail in the aforesaid U.S. Pat. No. 5,340,241. Each hollow housing 26, 27, and 28 has a gas inlet opening 31, 32 and 33, respectively, as well as a gas and product outlet opening 36, 37, and 38, respectively. In this particular embodiment, each of the gas inlet openings 31, 32, and 33 are connected by a conduit system 39 to a common gas inlet arrangement 41.

In order to control which of the product supply containers 11, 12, or 13 product is to be removed from and pneumatically conveyed toward a desired destination 16 or 17 or 18, at least two valves 42 are provided. Since three product supply containers 11, 12, and 13 have been disclosed above, three of the aforesaid valves 42 are utilized in the disclosed arrangement to control which product supply container has material removed therefrom and pneumatically conveyed through the conduit system 14. In this particular embodiment, the valves 42 are each identical to one another and have been identified below and in the drawings as valve 42A associated with the product supply container 11, valve 42B associated with the product supply container 12, and valve 42C associated with the product supply container 13. FIGS. 3–5 illustrate one embodiment of a valve 42, it being understood that the valve 42 described hereinafter corresponds to the valves 42A, 42B, and 42C mentioned above.

Each of the valves 42 includes a base plate 43 on which is slidably mounted a movable plate 44. In this particular embodiment, the base plate 43 includes an elongated plate-like member 46 having a flat and smooth surface $S_1$ and upstanding stops 47 and 48 at the longitudinal ends thereof. The movable plate also includes a plate-like segment 49 having a flat and smooth surface $S_2$ and depending side edges 51 and 52 along the lateral edges thereof which include inwardly facing tracks 53 and 54, respectively, in which is received the lateral edges of the elongated plate-like member 46. The surfaces $S_1$ and $S_2$ of the elongated plate-like member 46 and plate-like segments 49, respectively, are mutually opposing for purposes which will become apparent below.

The base plate 43 has, in this particular embodiment, a pair of through passageways 56 and 57 as shown in FIGS. 3–5. Each through passageway 56 and 57 includes a sleeve 58 and 59, respectively, to which conveyor piping P, or the like, can be fixedly secured as depicted in FIG. 3. The through passageways 56 and 57 as well as the sleeves 58 and 59 extend completely through the base plate 43. Further, the through passageways 56 and 57 are spaced from one another along the longitudinal length of the base plate 43.

The movable plate 44 has a single through passageway 61 provided therein and it, too, has a sleeve 62 extending through and from one side of the plate 44. The through passageway 61 is selectively alignable with the through passageways 56 and 57. When the movable plate 44 abuts against the stop 47, as shown in FIG. 4, the through passageway 61 is aligned with the through passageway 56. Similarly, when the other end of the movable plate 44 engages the stop 48, the through passageway 61 will become aligned with the through passageway 57.

A support plate 63 extends from one end of the base plate 43 adjacent the stop 48 as shown in FIGS. 3 and 4. A pneumatic cylinder 64, or equivalent, is fixedly mounted on the support plate 63 and has a reciprocal rod 66 joined to one end of the movable plate 44 by a bracket 67. A valve 68 is provided for controlling the direction of movement of the rod 66 in a conventional manner. A compressed air source 69 is utilized for supplying compressed air to the valve 68 while the valve 68 serves to control which end of the cylinder 64 the air is to be directed. A control mechanism 71 is provided for controlling the valve 68.

For the purpose of controlling which of the desired destinations 16, 17, or 18 product is to be supplied from the conduit system 14, a plurality of valves 42 are provided, one for each desired destination. However, each of the valves 42 are oriented in the conduit system 14 somewhat differently than the arrangement associated with the product supply containers 11, 12, and 13. For purposes of this further discussion, the valves associated with the desired destinations, or vacuum receivers 16, 17 and 18, will be identified as valves 42D, 42E, and 42F, respectively.

It will be noted from FIG. 1 that each of the valves 42A, 42B, and 42C are connected so that the through passageways 57A, 57B, and 57C, respectively, are connected in circuit to the gas and product outlets 36, 37, and 38, respectively. The through passageway 56A is free of connection to anything but could, if desired, be connected to the common conduit 39 connected in circuit with the common gas inlet arrangement 41. The through passageway 61A is connected in circuit through a conduit 72 to the through passageway 56B of the valve 42B. Similarly, the through passageway 61B is connected through a conduit 73 to the through passageway 56C of the valve 42C. The through passageway 61C is connected to the conduit system 14 and thence to the through passageway 61D of the valve 42D. The through passageway 56D of the valve 42D is connected through a conduit 74 to the gas and product inlet to the vacuum receiver 16. The through passageway 57D is connected through a conduit 76 to the through passageway 61E of the valve 42E. The through passageway 56E is connected through a conduit 77 to the vacuum receiver 17. The through passageway 57E is connected through a conduit 78 to the through passageway 61F of the valve 42F. The through passageway 56F is connected through a conduit 79 to the vacuum receiver 18. The through passageway 57F is not connected to anything but could, if desired, be connected to a product discharge bin should the control mechanism 71 fail and cause product to be diverted from the system through the through passageway 57F. It is to be recognized that other desired destinations may be connected in circuit with the through passageway 57F and in a manner that has been described above with respect to valves 42D, 42E, and 42F.

OPERATION

Although the operation of the pneumatic material handling system and the associated valves 42A–42F have been indicated somewhat above, the operation will now be described in detail hereinbelow to assure a more complete understanding of the invention.

As FIG. 1 depicts, material A is extracted from the product supply container 11 and is delivered via the conduit system 14 to the vacuum receiver 16 and an extruder machine associated therewith, but not shown in the drawing. In order for this to be accomplished, the control mechanism 71 activates the valve 68A to cause compressed air to be delivered to the appropriate end of the cylinder 64A to cause the through passageway 57A to be aligned with the through passageway 68A. As is already known from U.S. Pat. No. 5,340,241, a valve associated with the hollow housing 26 is activated to allow product to leave the product supply container 11 and enter the interior of the hollow housing 26. Since air is being drawn into the gas inlet 41, it will enter the gas inlet opening 31, and pass through the hollow housing 26 at a sufficient velocity to pick up and entrain product in the gas stream travelling through the conduit system 14. Gas and product will pass through the aligned passageways 57A and 61A of the valve 42A and thence through the conduit 72, aligned through passageways 56B and 61B of the valve 42B, and the aligned through passageways 56C and 61C of the valve 42C, and thence be delivered to the aligned through passageways 61D and 56D of the valve 42D and through the conduit 74 to the vacuum receiver 16. The control mechanism 71 controls the position of the rods 66 of the cylinders 64B, 64C, and 64D in order to effect the aforementioned conveyance of product to the vacuum receiver 16. The control mechanism 71 also controls the valves 42E and 42F to prevent gas and product from being delivered to the vacuum receiver 17 and 18.

When it is desired to no longer remove material A from the product supply container 11, the valving 68A and 68B is activated by the control mechanism 71 to alternate the position of the through passageways 61A and 61B to cause material B to be removed from the product supply container 12 and be introduced into the conduit system 14 through the unchanged valve 42C (see FIG. 2). Similarly, the valves 68D and 68F are activated to cause the through passageway 61D to become aligned with the through passageway 57D of the valve 42D so that gas and product will enter the conduit 76 and pass through the aligned through passageways 61E and 57E of the valve 42E and thence through the conduit 78 to the now aligned through passageways 61F and 56F so as to cause gas and product to enter the conduit 79 for delivery to the gas and product inlet to the vacuum receiver 18 as illustrated in FIG 2.

Other combinations of valve operations controlled by the control mechanism 71 are, of course, possible in order to cause material C to be removed from the product supply container 13 and be delivered to any one of the vacuum receivers 16, 17, or 18. Further discussion in regard to how this might be accomplished is believed to be well understood from the aforesetforth discussion so that further description thereof is deemed to be unnecessary.

Whenever a vacuum connection to the exhaust blower 21 is provided to a valve 42A–42F, the drawing of air from each valve will cause any air existing between the mutually opposing surfaces $S_1$ and $S_2$ to be drawn therefrom so as to draw the surfaces tightly together to provide a sealed relationship therebetween.

An important feature to recognize is that the only sealed vessel that needs to be sealed at the time of product conveyance is the one to which product is being conveyed. The other containers (or vacuum receivers) can be in an "idle" condition, namely, open to atmosphere because the associated valves 24 will block access to the exhaust blower 21. If two of the vacuum receivers 17 and 18 in FIG. 1, for example, were open to atmosphere by reason of a discharge of product therefrom, the closed valves 24 would prevent air from being drawn to the blower 21. Further, the tightly sealed characteristic between the surfaces $S_1$ and $S_2$ of the valves 42D and 42E in the positions shown in FIG. 1 will prevent a short circuiting of the vacuum force drawing product into the vacuum receiver 16.

ALTERNATE CONSTRUCTION (FIGS. 6–9)

An alternate valve construction 81 is illustrated in FIGS. 6–9. The alternate valve construction 81 includes a base plate 82 having a pair of through passageways 56 and 57 provided thereon. The reference numerals 56 and 57 correspond to the reference numerals utilized for the previous valve 42 described in FIGS. 3–5. The construction of the through passageways is essentially the same and, therefore, further comment in regard to the construction of the through passageways is believed unnecessary. The base plate 82 includes a circular shaped flat plate 83 having a stub shaft 84 extending axially from the face of the plate portion 83 which is remote from the sleeves 58 and 59 extending outwardly from the center of the plate 83 as shown in FIGS. 7 and 8. Also extending outwardly from the same flat surface of the plate 83 is a radially offset stop 86. A movable plate 87 is provided and it, too, is circular in shape and conforms in diameter to the diameter of the plate 83. The movable plate 87 has a central hole therein and is adapted to receive the stub shaft 84 therethrough as shown in FIG. 7. The movable plate 87 also has an arcuate slot 88 adjacent the perimeter thereof and receiving the stub 86 therethrough. As a result of the aforesaid construction, the movable plate 87 is rotatable about the axis defined by the stub shaft 84 between the limits defined by opposite ends of the arcuate slot 88.

The movable plate 87 has a through passageway 61 corresponding to the through passageway 61 on the valve 42 described above. A swivel construction 89 allows a swivelling of the sleeve 62 relative to the conveyor piping 91 which will occur when an electric drive motor M is activated to cause the movable plate 87 to be rotated relative to the base plate 82. The motor M can be any conventional type of electrically operated servo motor and accompanying connection to the movable plate 87 to effect the aforesaid relative movement between the movable plate 87 and the base plate 82. The control mechanism 71 illustrated in FIG. 1 can be adapted to provide the requisite electrical signal to drive the drive motor M through the requisite distance to cause the ends of the arcuate slot to engage the stop 86 so as to define the aforesaid first and second positions of the movable plate 87.

Since the same reference numerals have been used in describing the through passageways on the alternate valve construction 81, an adaptation of the alternate valve into the circuitry illustrated in FIGS. 1 and 2 will be readily apparent to those skilled in this art area without any further discussion being required.

Since the mutually opposing surfaces of the base plate 43 and the movable plate 44 of the valve 42 as well as the mutually opposing surfaces of the base plate 82 and the movable plate 87 in the valve 81 are flat and smooth, and in view of the vacuum being drawn in the conduit system passing through each of the respective valves, the flat and smooth surfaces will be drawn closely together by the vacuum force to cause an appropriate seal to occur between the mutually opposed surfaces so as to prevent air from entering the conduit system through the valve construction. As a result, the vacuum force in order to convey gas and produce through the conduit system 14 is maintained throughout the length of the conduit system and without the necessity of providing expensive sealed valving arrangements.

While FIGS. 1 and 2 illustrate one specific type of product source and one type of desired destination, FIG. 10 illustrates a variety of dry, powdered, and/or granular product supply containers 101, 102, and 103 and a variety of devices 104, 105, and 106 for extracting product from the containers, respectively. Each of the devices is a volumetric feed or metering device which regulates the rate and amount of product per unit of time introduced into a respective product gas entrainment enhancing device 107, 108, and 109 having both gas and product inlet openings therein.

A variety of desired destinations 110 and 111 are also illustrated in FIG. 8. All of the desired destinations are, as they also are in FIGS. 1 and 2, sealed containers. Product delivered to the desired destinations 110 and 111 may be continuously or intermittently discharged therefrom.

FIG. 10 also illustrates the inventive valve 42 connected in circuit with each of the variety of product sources 101, 102, and 103 and desired destinations 110 and 111. The valves 42 are operated in accordance with the text presented above.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

I claim:

1. In a pneumatic material handling system which includes a conduit arrangement for conveying dry, solid particulate product to a selected one of plural destinations from a selected one of at least two separate upstanding dry, solid particulate product supply containers each having a product outlet opening located at a lower end thereof and delivering the dry, solid particulate product thereof to a gas and product opening for conveyance of gas and the product thereof to said selected one of said plural destinations, the system having first means defining a gas inlet opening and second means for joining the gas and the product from the selected one of the two separate product supply containers for delivery to a respective one of said gas and product openings, said gas inlet opening and the respective one of said gas and product openings being connected to said conduit arrangement so that a gas stream traveling at a sufficient velocity through said conduit arrangement will be sufficient to pick up and entrain the dry, solid particulate product in the gas stream, said conduit arrangement including a gas pumping means for pulling the gas stream into said gas inlet opening and through said conduit arrangement, said gas pumping means being connected to said conduit arrangement adjacent a gas outlet end thereof so as to create a less than atmospheric pressure inside said conduit arrangement and effecting a drawing of the gas into said conduit arrangement through said gas inlet opening, the improvement comprising at least first and second identically constructed valves connected into said conduit arrangement intermediate each said gas and product opening and said selected one of said plural destinations, each said first and second identically constructed valves comprising:

a base plate having at least first and second separate through passageways extending therethrough, a movable plate slidably mounted on said base plate and movable between first and second positions relative to said base plate, said movable plate having a third through passageway extending therethrough and being axially aligned with said first through passageway in said first position of said movable plate and with said second through passageway in said second position of said movable plate, said base plate and said movable plate each having mutually opposed and slidably engaged flat surfaces, means for facilitating a sealingly drawing together of said mutually opposed and slidably engaged flat surfaces in response to said less than atmospheric pressure inside said conduit arrangements, and a drive means for moving said movable plate between said first and second positions;

first connecting means for connecting each said gas and product opening to a respective one of said first through passageways on said first and second identically constructed valves;

second connecting means for connecting said second through passageway on said first valve to said third through passageway on said second valve; and third connecting means for connecting said third through passageway on said first valve to said conduit arrangement leading to said selected one of said plural destinations;

whereby a positioning of said movable plate of said first and second valves in a selected one of said first and second positions will effect a selecting of the dry, solid particulate product supply container from which dry, solid particulate product thereof is to be introduced to the respective one of said gas and product openings, be picked up and entrained in the gas stream thereat, and conveyed to said selected one of said plural destinations.

2. The pneumatic handling system according to claim 1, wherein said plural destinations include at least two separate destinations; and wherein the improvement further comprises at least third and fourth valves, identical to said first and second valves, and connected into said conduit arrangement intermediate said first valve and said two separate destinations;

wherein said third connecting means includes a fourth connecting means for connecting said third through passageway on said first valve to a third through passageway on said third valve, a fifth connecting means for connecting a second through passageway on said third valve to a third through passageway on said fourth valve, and a sixth connecting means for connecting a first through passageway on said third valve to a first of said two destinations, and a seventh connecting means for connecting a first through passageway on said fourth valve to a second of said two destinations; and wherein each of said third and fourth valves further comprises further and separate drive means for controlling which of said two separate destinations a respective one of said products is to be conveyed.

3. The pneumatic handling system according to claim 2, wherein each said destination is a sealed vessel.

4. The pneumatic handling system according to claim 3, wherein each said sealed vessel is a vacuum receiver.

5. The pneumatic handling system according to claim 1, wherein each said drive means is fixedly mounted to a respective said base plate and includes an extendible and retractable drive rod fastened to a respective said movable plate for effecting a movement of said respective movable plate relative to said respective base plate.

6. The pneumatic handling system according to claim 5, wherein each said base plate is an elongated rectangular plate whose length is greater than its width; and wherein each said movable plate is also an elongated, rectangular plate with guide means being provided thereon and guidingly operatively engaging lateral edges of a respective said base plate.

7. The pneumatic handling system according to claim 1, wherein each said drive means is a rotary servo drive connected to a central portion of a respective said movable plate to effect a rotary movement of the respective said movable plate between a respective said first and second position to orient a respective said third through passageway with a selected one of a respective said first and second through passageway.

8. The pneumatic handling system according to claim 7, wherein each said base plate includes a stop member, and wherein each said movable plate includes an arcuate slot in which said stop is received, opposite ends of said slot serving as a location of said first and second positions of each said movable plate.

* * * * *